United States Patent Office 3,316,280
Patented Apr. 25, 1967

3,316,280
PROCESS FOR THE PRODUCTION OF SUBSTITUTED 5,8-DICHLORO ANTHRAQUINONES
Heinrich Vollmann and Walter Hohmann, Leverkusen, and Fritz Baumann, Opladen, Germany, assignors to Farbenfabriken Bayer Aktiengesellschaft, Leverkusen, Germany, a German corporation
No Drawing. Filed Mar. 18, 1963, Ser. No. 266,045
Claims priority, application Germany, Mar. 22, 1962, F 36,343; Mar. 27, 1962, F 36,380; June 26, 1962, F 37,160; Dec. 18, 1962, F 38,878; Feb. 11, 1963, F 38,977
5 Claims. (Cl. 260—381)

It has been found that compounds of the formula

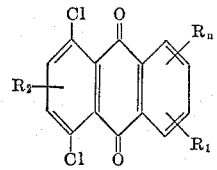

in which R stands for a nitro or optionally substituted amino group and wherein the radical $R_1$ stands for hydrogen or a substituent and $R_2$ for hydrogen or a substituent of the first order but not an amino group, and wherein $n$ stands for the number 1 or 2, are obtained if compounds of the general formula

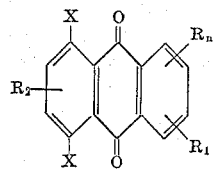

in which R, $R_1$, $R_2$ and $n$ have the aforesaid significance and in which X stands for hydrogen or one X stands for chlorine, or mixtures of these compounds are chlorinated in sulphuric acid optionally containing $SO_3$ or in chlorosulphonic acid in the presence of known halogenating catalysts.

The compounds to be used according to the invention as starting materials can contain as substituted amino groups in the radical R, for example, monoalkyl or dialkyl amino groups, the alkyl groups of which contain preferably up to four C-atoms and in which the alkyl radicals of the dialkyl amino groups may form a closed ring via heteroatoms such as O, N or S. The substituted amino groups can also be mono- or diacylamino groups of organic carboxylic acids as well as of inorganic acids. The radical R preferably stands in α-position of the anthraquinone but can also be in β-position. The substituent $R_1$ can be of the first as well as of the second order, such as for example halogens, such as chlorine or bromine, sulphonic acid groups, carboxylic acid groups, alkyl radicals, preferably lower alkyl radicals with up to four carbon atoms, such as methyl, ethyl, propyl, and aldehyde-, nitro- or alkoxy-, preferably lower alkoxy sulphone groups. The radical $R_2$ stands for a substituent of the first order with the exception of amino groups such as for example halogens like chlorine or bromine, or alkyl radicals, especially lower alkyl radicals with up to four carbon atoms, such as methyl or ethyl groups.

Examples of the compounds to be used according to the invention are the following:

1-amino-anthraquinone
1-amino-5-chloro-anthraquinone
1-amino-8-chloro-anthraquinone
1-amino-4-chloro-anthraquinone
1-amino-3-chloro-anthraquinone
1-amino-6-chloro-anthraquinone
1-amino-7-chloro-anthraquinone
1-amino-4,6-dichloro-anthraquinone
1-amino-2,4-dichloro-anthraquinone
1-amino-2,4-dibromo-anthraquinone
2-amino-anthraquinone
1,3-dichloro-2-amino-anthraquinone
1-methylamino-anthraquinone
1,4-diamino-anthraquinone
1,3-diamino-anthraquinone
2,3-diamino-anthraquinone
1-amino-anthaquinone-2-sulphonic acid sodium salt or
1-amino-anthraquinone-2-carboxylic acid
1-nitro-5-chloro-anthraquinone
1-nitro-8-chloro-anthraquinone
1-nitro-anthraquinone
1-phthalimido-anthraquinone

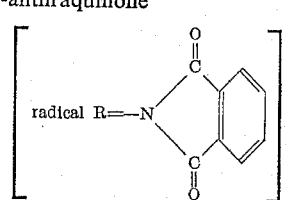

1,4-di-phthalimido-anthraquinone
1,4-disulphimido-anthraquinone (for preparation see below)
1,4-disulphimido-2,3-dichloro-anthraquinone The 1,4-disulphimido-anthraquinones which may for example be used as starting materials according to the invention can be produced according to the process described in German patent specification 268,592 by reacting optionally substituted 1,4-diamino-anthraquinones which contain at least one free 5- or 8-position, with fuming sulphuric acid until compounds are formed which are insoluble in water but soluble in alkali. As fuming sulphuric acid, preferably a sulphuric acid is used with at least 30% $SO_3$-content.

The compounds thus obtained were originally considered as 1,4-dianhydro-sulphamides of the Formula I (see German patent specification 268,592). As could be later shown, the isolated compounds possess a marked reactivity in the 2- and 3-position (see German patent specification No. 931,830) wherefrom the presence of a structure according to Formula II was inferred.

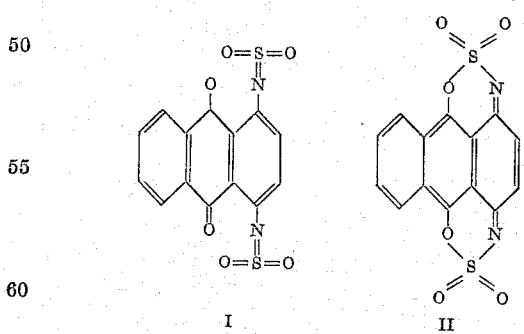

The compounds used as starting material for the chlorination according to the invention are designated for the sake of simplicity in the following briefly as 1,4-disulphimido-anthraquinones.

If compounds containing acylamino groups are used for the process of the present invention, such as phthalimido-anthraquinones and disulphimido-anthraquinones, it is generally expedient after the chlorination, to convert the acylamino groups by an acid hydrolysis into amino groups. This can be achieved for example by diluting reaction mixture with water after completion of the chlorination to the extent that the sulphimido groups can be hydrolysed without risk of sulphation, which is the case with, for example 80–90% sulphuric acid. The amine solutions are either added directly to water or slowly diluted with water, depending on the required degree of purity whereby the amines at first separate as well crystallised sulphates, which are isolated by filtering off with suction and can be hydrolysed with water to the free amines.

As solvents for the chlorination according to the invention, sulphuric acids with a content of 95–100% $H_2SO_4$, oleum and also chlorosulphonic acids can be used. If chlorination is carried out in oleum, the $SO_3$-content can be varied as desired with the sole limitation that the reaction conditions must be so selected that no sulphonation occurs. The concentration of the solutions in the amines applied as starting products can be varied within wide limits and preferably lies between the 10-fold and 20-fold amount by weight of solvent.

As halogenation catalysts the substances described for this purpose in the literature may be used. Without excluding other catalysts, there may be mentioned: sulphur chloride, ferric chloride and especially iodine. They are used for example in amounts of 0.1 to 5 percent by weight of the product to be chlorinated. It is however advantageous, to add at least 0.5 percent by weight, since otherwise the halogenation would, in general, only proceed very slowly.

The chlorination takes place at temperatures between 0 and 80° C. in an exothermal reaction. The reaction proceeds smoothly already at room temperature, but it is advantageous to work at a slightly elevated temperature, preferably, at 25–50° C. since a rapid take up of chlorine, especially towards the end of the reaction is thus achieved with small amounts of catalyst.

The duration of the reaction depends on the temperature selected, the type of solvent, the amount and degree of dispersion of the halogen carrier as well as the distribution of chlorine in the liquid. By modifying these factors the reaction velocity can be varied within wide limits. The required time amounts in general to one half to three hours.

To determine the end point of the chlorination, the course of the temperature during the reaction offers a first criterion. The temperature rises at first with uniformly rapid take up of chlorine and remains for some time at a maximum. As soon as it begins to fall, the reaction has substantially ended. Further aids are, for instance if 1-amino-anthraquinone is used, the chromatographic testing of samples which permit one to recognise well the consumption of the starting products and the increasing formation of the desired 1,4-dichloro-5-amino-anthraquinone. Finally, reference can be made to the solution colour in boron acetic acid anhydride and especially in 40% oleum. Whereas 1-amino-anthraquinone is soluble therein with a Bordeaux-red colour, 1,4-dichloro-5-amino-anthraquinone dissolves with a greenish blue colour. The samples allow the chlorine content to be determined with great precision in each reaction phase.

After the take up of 1 to 2 chlorine atoms, a notable slowing-down sets in of the rate of take up of chlorine. Since, however, after the stage of the dichlorine amino anthraquinone, further chlorine is taken up slowly, an over-chlorination is expediently avoided. It is made noticeable by an increasing shift towards the green in the colour of the solution of a sample in 40% oleum as well as by the appearance of 1-amino-4,5,8-trichloro-anthraquinone in chromatographed samples.

As shown by the following experiment, it was not to be foreseen that the halogen atoms would substitute predominantly the free α-positions in the unsubstituted benzene ring. If a solution of 25 grams of 1-amino-anthraquinone in 225 ml. of 4% oleum is treated with chlorine with addition of 0.3 gram of iodine at 40° C. until a sample dissolves in 40% oleum with the same colour as a mixture of 50% each of 1-amino-5-chloro- and 1-amino-8-chloro-anthraquinone followed by working up as described in Example 1, then 27.9 grams are obtained with a chlorine content of 14% (theoretical: 13.8% for monochloroamino anthraquinone). Chromatograms show that a mixture of 1-amino-5-chloro-, 1-amino-8-chloro-, 1-amino-5,8-dichloro- and 1-amino-anthraquinone is present. On the other hand, 1-amino-2-chloro-, 1-amino-4-chloro- and 1-amino-2,4-dichloro-anthraquinone can be detected only to a very small extent, or not at all.

The quality of the crude chlorinated anthraquinones obtained according to the invention is in many cases satisfactory. If a purer quality is desired, the sulphate can be separated following the chlorination, by lowering the concentration of the acid, and then be isolated and decomposed with water. Naturally the products can be redissolved also in organic solvents. Very good purifying action is also achieved by acylating, isolation of the acylamino compounds and again hydrolysing.

The chlorinated anthraquinones obtained according to the invention are valuable intermediate products for the production of vat, dispersion and pigment dyestuffs. To some extent they themselves dye synthetic fibres in clear strong shades.

The following examples are given for the purpose of illustrating the invention.

*Example 1*

25 g. of 1-amino-anthraquinone are dissolved in 200 ml. of chlorosulphonic acid. Into this solution, after the addition of 0.5 g. of finely powdered iodine, chlorine is passed with vigorous stirring, whereby the temperature rises to 30° C. At this temperature further chlorine is led in (if necessary while cooling) until a sample worked up in 40% oleum shows the same colour in solution as pure 1,4-dichloro-5-amino-anthraquinone which had been obtained from 1,4-dichloro-anthraquinone.

The melt is placed on ice-water, the resulting precipitate is filtered off with suction, washed neutral and dried. Red amorphus powder. Yield: 31.7 g.=97% of the theoretical. Chlorine content: 24.5% (theoretical 24.2%). Melting point after recrystallisation from chlorobenzene 209 to 214° C.

*Example 2*

25 g. of 1-amino-anthraquinone are dissolved in 200 ml. of 1% oleum at 35° C., mixed with 1 g. of iodine and treated with chlorine while being thoroughly mixed. The temperature rises in about 15 minutes to 40° C. and is held there until the amount of chlorine required for dichlorination has been taken up. Excess chlorine, and the hydrochloric acid formed are driven off with air. The melt is turned out onto water, the precipitate is filtered off with suction, washed neutral and dried. Yield: 31.7 g.=97% of the theoretical. Chlorine content: 23.6%. This product dissolves in concentrated $H_2SO_4$ with a yellow colour, in 20% oleum with an orange colour, and in 40% oleum with a greenish blue colour. The solution in boron acetic anhydride is blue-red.

*Example 3*

25 g. of 1-amino-anthraquinone are dissolved in 180 ml. of 4% oleum at 20° C., mixed with 0.5 g. of iodine and treated with chlorine at 25° C. until a chlorine content of 23.6 to 24.5% is reached. After working up as in Example 1, 31.2 g.=95% of the theoretical are obtained. By benzoylation, 1,4-dichloro-5-benzoylamino-anthraquinone is obtained therefrom in very good yield. M.P. after a single recrystallisation from nitrobenzene: 226 to 229° C. A mixed melting point with pure 1,4-dichloro-5-benzoylamino-anthraquinone (melting point 227 to 229° C.) obtained from 1,4-dichloro-anthraquinone, shows no depression.

Example 4

28.8 g. of 1-amino-5-chloro-anthraquinone are dissolved in 200 ml. of sulphuric acid monohydrate and chlorinated after addition of 1 g. of iodine for 1½ hours at 40 to 42° C. After pouring into water and working up there are obtained: 31.5 g. of 1,4-dichloro-5-amino-anthraquinone. Chlorine content: 24.7%, melting point 198 to 205° C. Benzoylation in nitrobenzene gives 1,4-dichloro-5-benzoylamino-anthraquinone with melting point 216 to 225° C. in very good yield. Instead of iodine, the equivalent amount of sulphur chloride can be used as catalyst with equally good results.

Example 5

25.0 g. of 1-amino-8-chloro-anthraquinone are dissolved in 250 ml. of concentrated $H_2SO_4$ and chlorinated at 45 to 50° C. with portionwise addition of 1.5 g. of iodine, until a sample is soluble in 40% oleum with a clear blue colour. After working up, 26.2 g. are obtained, chlorine content: 23.0%.

Example 6

25.0 g. of 1-amino-anthraquinone are dissolved in 225 ml. of 4% oleum and treated with addition of 0.3 g. of iodine, at 40° C., with chlorine until a sample dissolves in 40% oleum with the same colour as a mixture from 50% each of 1-amino-5-chloro- and 1-amino-8-chloro-anthraquinone. It is then worked up as described in Example 1. Yield: 27.9 g. Chlorine content: 14% (theoretical: 13.8% for monochloro-amino-anthraquinone). Chromatograms show that a mixture of 1-amino-5-chloro-, 1-amino-8-chloro-, 1-amino-5,8-dichloro- and 1-amino-anthraquinone is present. On the other hand, 1-amino-2-chloro-, 1-amino-4-chloro-, and 1-amino-2,4-dichloro-anthraquinone can be detected only to a very small extent or not at all.

Example 7

50 g. of 1-amino-5-chloro-anthraquinone are dissolved in 350 ml. of 4% oleum and treated, after addition of 0.5 g. of iodine, at 30–35° C., with chlorine until a sample in 40% oleum conforms to standard. It is then carefully diluted with water to 70% acid and stirred for a long time in the cold. The separated sulphate is filtered off with suction, washed successively with dilute sulphuric acid and water until the runnings are neutral, and dried. Yield: 42.5 g., melting point 206–211° C. By benzoylation there is obtained therefrom in very good yields, 1,4-dichloro-5-benzoylamino-anthraquinone of melting point 224–228° C.

If dilution is taken to 65% acid instead of 70% acid, a somewhat lower quality of 1,4-dichloro-5-amino-anthraquinone is obtained.

Example 8

28.8 g. of 1-amino-4-chloro-anthraquinone are dissolved in a mixture of 225 ml. of sulphuric acid monohydrate and 12.5 ml. of 20% oleum and treated with chlorine at 35–40° C. with good gas distribution until 2 atoms of chlorine per anthraquinone molecule have been taken up. This is the case after about 3 hours. The melt is then turned out onto water, the resulting precipitate is filtered off with suction, washed neutral and dried. 30.3 g.=96% of the theoretical of 1-amino-4,5,8-trichloro-anthraquinone are obtained. Chlorine content: 32.3% (theoretical 32.6). Melting point after recrystallisation: 300–302° C. The compound has not been known hitherto; its constitution is given by the formation of 1,4,5-trichloro-anthraquinone by de-amidation via the diazonium compound. The clear yellow solution of the 1-amino-trichloro-anthraquinone in concentrated sulphuric acid changes to a dirty blue-red upon addition of $CH_2O$. In 40% oleum it is soluble with a greenish blue colour. By benzoylation of the crude amine, 1-benzoyl-amino-4,5,8-trichloro-anthraquinone is obtained in very good yield, having a melting point of 281–285° C. (melting point pure: 287–289° C.).

This compound can also be obtained by chlorination of 1-benzoylamino-5,8-dichloro-anthraquinone with $SO_2Cl_2$.

Example 9

15 g. of 1,4-dichloro-5-amino-anthraquinone are dissolved in 225 ml. of chlorosulphonic acid and chlorinated with addition of 0.7 gram of iodine until a sample contains 32–33% of chlorine; this is the case after about 3 hours. After the usual working up a product is obtained which, after purification by way of the benzoylamino compound, is identical with that of Example 8.

Instead of working in chlorosulphonic acid, the chlorination can be carried in 2–10% oleum with the same result.

Example 10

If 1-amino-anthraquinone is employed in the material of Example 9 instead of 1,4-dichloro-5-amino-anthraquinone, and chlorinated (about 5 to 6 hours) until the crude product possesses the chlorine content required for trichloro-amino-anthraquinone, a crude amine is obtained in 90% yield from which 1-amino-4,5,8-trichloro-anthraquinone may be isolated likewise, although in somewhat smaller yield.

Example 11

25 g. of 1-amino-3-chloro-anthraquinone are treated in a 10-fold amount by volume of 1% oleum with chlorine with addition of 0.5 g. of iodine at 35° C. with vigorous mixing, until a sample shows a take up of 2 chlorine atoms. After turning out onto water and the usual working up, 31.4 g.=98.5% of the theoretical of trichloro-amino-anthraquinone are obtained. Chlorine content: 33.1%. By benzoylation, 1-benzoylamino-3,5,8-trichloro-anthraquinone is obtained therefrom in good yield having a melting point of 236–240° C. Melting of the pure product: 243–244° C. By hydrolysis, pure 1-amino-3,5,8-trichloro-anthraquinone is obtained therefrom with a melting point of 293–294° C. This hitherto unknown compound crystallises in pale red needles which dissolve in concentrated $H_2SO_4$ with a greenish yellow colour; this solution colour changes to Bordeaux on addition of formaldehyde. The solution colour in boron acetic anhydride is violet, in 40% oleum it is greenish blue but distinctly more reddish than in the case of the isomeric 4,5,8-trichloro-amino-anthraquinone.

Example 12

28.8 g. of 1-amino-6-chloro-anthraquinone are dissolved in 275 ml. of 2% oleum and chlorinated with addition of some iodine at 25° C. until a sample possesses a chlorine content of 24–24.5%. By benzoylation of the crude chlorination product a dichloro-benzoylamino compound is obtained in 80% yield which melts between 211 and 220° C. Melting point after recrystallisation: 226–227° C. Chlorine content: 17.9%. On hydrolysis a hitherto unknown dichloro-amino-anthraquinone of melting point 231–233° C. is obtained. Since it is not identical with either 1-amino-2, 6-dichloro: nor with 1-amino-4,6 dichloro-anthraquinone, the chlorine must have entered into the anthraquinone nucleus free from amino groups.

Example 13

28.8 g. of 1-amino-7-chloro-anthraquinone are chlorinated as in Example 10. 32.8 g. are obtained of an amine with a chlorine content of 23.8%. After purification by way of the benzoylamino compound (melting point 198–200° C.) a homogenous hitherto unknown dichloro-amino-anthraquinone of melting point 274–276° C. is obtained. It dissolves in boron acetic anhydride with a violet colour and in 40% oleum wth a bluish violet colour.

Example 14

7 grams of 1-amino-4,6-dichloro-anthraquinone (obtained by chlorination of 1-benzoylamino-6-chloro-anthraquinone with $SO_2Cl_2$) are chlorinated in 120 ml. of 4% oleum with addition of some iodine for one hour it 30° C. After the usual working up a trichloro-aminoanthraquinone is obtained in almost theoretical yield (chlorine content: 32.5%). After purification by way of the benzoylamino compound (melting point 276–280° C.) it melts at 284–287° C. Solution colour in $H_2SO_4$: green-yellow; and upon addition of $CH_2O$: dirty reddish violet. It dissolves in boron-acetic-anhydride substantially more blue than the 1-amino-4,6-dichloro-anthraquinone employed.

*Example 15*

15 g. of 1-amino-2,4-dichloro-anthraquinone are chlorinated in 140 ml. of 2% oleum with addition of iodine at 35° C., until a sample shows a take up of 2 further chlorine atoms. A brown-orange product is obtained which melts are redissolving in nitrobenzene at 281–282° C. Analysis: 39.0% of chlorine (39.2% theoretical for tetrachloro-amino-anthraquinone). Acetyl derivative: melting point 250–252° C.

That 2,4,5,8-tetrachloro-1-amino-anthraquinone is present in the chloro amine thus obtained is apparent from the fact that according to the present process by chlorination of 2,4,5-trichloro-1-amino-anthraquinone (produced according to the process of U.S. patent specification No. 2,128,178) the same tetrachloro amine is obtained and this could also be obtained from 1-amino-5,8-dichloro-anthraquinone by after-chlorinating with hydrochloric acid and chlorate.

*Example 16*

If 1-amino-2,4-dibromo-anthraquinone is subjected to chlorination according to the process of Example 15, whereby it is expedient not to exceed a temperature of 20° C., a product is obtained in which 1-amino-2,4-dibromo-5,8-dichloro-anthraquinone is presumed to be present.

*Example 17*

25 g. of 2-amino-anthraquinone are dissolved in 225 ml. of sulphuric acid monohydrate and 12.5 g. of 20% oleum and chlorinated with addition of 1 g. of iodine at 35→40° C., until 4 atoms of chlorine are taken up. After the usual working up, an amine is obtained in good yield which, after purification by way of the acetyl compound (melting point 230–231° C.) melts at 358–360° V. and possesses a chlorine content of 38.8% (theoretical: 39.2% for tetrachloro-amino-anthraquinone).

*Example 18*

25 g. of 1,3-dichloro-2-amino-anthraquinone are dissolved in 250 ml. of 2% oleum and treated with chlorine with addition of 0.7 g. of iodine starting at 25° C. The temperature rises to 32° C. and is held there for two hours. 23.5 g. of amino are obtained with a chlorine content of 38.7%. By acetylation there are obtained therefrom 88% of the theoretical of tetrachloro-acetylamino-anthraquinone of melting point 222–230° C. (melting point pure: 230-232° C.). This product is identical with that obtained in Example 17. Very probably 2-amino-1,3,5,8-tetrachloro-anthraquinone is present.

*Example 19*

23 grams of 1-methylamino-anthraquinone are chlorinated at 25–30° C. in 2% oleum in the usual way for two hours. After working up, 25 g.=85% of the theoretical are obtained of dichloro-methylamino-anthraquinone, which crystallises after recrystallisation from chlorobenzene or nitrobenzene in long brown-red needles of melting point 245–247° C. Chlorine content: 23.9%. This product dissolves in 40% oleum with a clear greenblue colour, while 1-methylamino-anthraquinone dissolves with a red-violet and 1-methyl-amino-2,4-dichloro-anthraquinone with a green-yellow colour. Since the reaction product can be obtained also by chlorination of 1-methylamino-5-chloro-anthraquinone there is no doubt that the hitherto unknown 1-methylamino-5,8-dichloro-anthraquinone is present.

*Example 20*

25 g. of 1,4-diamino-anthraquinone are dissolved in 250 ml. of chlorosulphonic acid, treated with 1 g. of iodine and chlorinated at 35–37° C. for three hours. After turning out onto ice, chlorinated 1,4-diamino-anthraquinone is obtained in good yield with 23.3% of chlorine (23.1% theoretical for a dichloro derivative). This reaction product contains, as can be shown chromatographically, no 1,4-diamino-2,3-dichloroanthraquinone. It is rather difficult to dissolve in high boiling organic solvents and crystallises from nitrobenzene or aniline in beautiful blue needles which melt at 335–340° C. The colour of the solution in pyridine is clear blue, and in 40% oleum it is clear green.

*Example 21*

50 g. of 1-amino-anthraquinone-2-sulphonic acid sodium salt (81%) are chlorinated in 500 ml. of 2% oleum with addition of 1 g. of iodine starting at 35° C. The temperature rises to 45° C. After 45 minutes there is no longer any starting material present, and after 1½ hours the chlorination is interrupted and the $H_2SO_4$ concentration is brought to 55% acid with water at below 40° C. The separated sulphate is filtered off with suction, washed with $H_2SO_4$ and pressed off well. The filter cake is dissolved in boiling hot water and the pale red solution clarified. On cooling, the free sulphonic acid separates in long red needles which are filtered off with suction, washed free from sulphate with dilute hydrochloric acid, and dried.

Yield: 25.1 g. Chlorine content: 25.6%; this corresponds to the theoretical value for a trichloro-aminoanthraquinone sulphonic acid.

The acid dissolves in 40% oleum with a blue colour, in sulphuric acid with addition of p-formaldehyde with a greenish blue colour.

*Example 22*

26.7 g. of 1-amino-anthraquinone-2-carboxylic acid are chlorinated in 250 ml. of 2% oleum with addition of some iodine starting at 35° C. After a rise of temperature up to 45° C. it is held for four hours at 35° C. After the usual working up, 31.6 g. are obtained of a carboxylic acid with a chlorine content of 28.1% (theoretical for trichloro-anthraquinone-carboxylic acid: 28.7%). Melting point after recrystallisation from nitrobenzene: 314–317° C. Red glittering leaflets, which dissolve in boron acetic anhydride with a blue-violet colour, in sulphuric acid with p-formaldehyde with a greenish blue colour, and in 40% oleum with a blue colour. On boiling with acetic acid anhydride orange-yellow coloured needles are obtained of decomposition point 280° C.

*Example 23*

10 g. of 1-dimethylamino-anthraquinone are dissolved in 100 ml. of 3.5% oleum and heated with addition of 0.5 g. of iodine to 35° C., and then chlorinated. The temperature rises of itself up to about 45° C. As soon as it begins to fall again, the chlorination is ended, the reaction material is put in water, the resulting solution clarified and rendered alkaline with ammonia. The violet-red precipitate is filtered off, washed neutral and dried. Yield: 53.6 grams=95% of the theoretical.

By redissolving in glycol monomethyl ether, coarse dark red needles of melting point 190° C. are obtained. Chlorine content: 22.4%. Since an identical preparation was obtained by methylating 1-amino-5,8-dichloro-anthraquinone, 1 - dimethylamino - 5,8-dichloro-anthraquinone is present.

If, instead of 1-dimethylamino-anthraquinone, other 1-dialkylamino-anthraquinones whose alkyl groups may be the same or different, are treated with chlorine in the same way, the 5,8-dichloro derivatives of these compounds are always obtained.

Example 24

10 g. of 1-piperidino-anthraquinone are dissolved in 100 ml. of 3% oleum and chlorinated strongly at 35° C. until a clear fall of temperature can be detected. This is the case after about twenty minutes. The reaction mixture is put into water and the resulting solution is clarified. From the clear yellow filtrate, dichlorinated piperidino-anthraquinone separates upon addition of ammonia in fine red needles, which are filtered off with suction, washed neutral and dried. Yield. 9.5 g.=76% of the theoretical. The product crystallises from glycol monomethyl ether in large red needles of melting point 170–172° C. Chlorine determination: 20.3%. 1 - piperidino-5,8-dichloro-anthraquinone is present, since by cold treatment with an excess of piperidine the same dipiperidino-monochloro-anthraquinone is obtained as is formed under the same reaction conditions also from 1-nitro-5,8-dichloro-anthraquinone.

If the corresponding amount of 1-morpholino-anthraquinone is employed instead of 1-piperidino-anthraquinone, then 1-morpholino-5,8-dichloro-anthraquinone is obtained in the same way.

Example 25

50 g. of 1-nitro-5-chloro-anthraquinone are dissolved in 500 ml. of chlorosulphonic acid at room temperature; after addition of 1 gram of finely divided iodine, chlorine is led into this solution with vigorous stirring. The temperature rises to 28° C. and then falls again slowly. The reaction is interrupted when a sample possesses the chlorine content required for dichloro-nitro-anthraquinone. This point is reached when a sample has clearly melted at 258° C.

The melt is turned out onto ice water, the precipitate is filtered off with suction, washed neutral and dried. Pale yellow amorphous powder. Yield: 53.9 g.=96% of the theoretical. Melting point 242–250° C. Chlorine content: 21.7% (theoretical: 22.05%).

By recrystallising from nitrobenzene the product melts at 252–256° C. and gives with pure 1,4-dichloro-5-nitro-anthraquinone (obtained by nitration of 1,4-dichloro-anthraquinone) no melting point depression.

Example 26

50 g. of 1-nitro-8-chloro-anthraquinone are dissolved in 500 ml. of sulphuric acid monohydrate at 30° C. mixed with 1 g. of sulphur chloride, treated with chlorine as in Example 25 and worked up.

Yield: 54.1 g.=97% of the theoretical. Melting point 239–248° C. Chlorine content: 22.0%. Recrystallisation from nitrobenzene gives pure 1,4-dichloro-5-nitro-anthraquinone.

Example 27

90 g. of a mixture of 1,5- and 1,8-nitro-chloro-anthraquinone (as can be obtained in very good yield by nitration of anthraquinone-1-sulphonic acid potassium salt in sulphuric acid, followed by treatment with nascent chlorine) are dissolved in 1200 g. of 2.5% oleum at 30° C., mixed with 1.5 g. of iodine and treated with chlorine with vigorous mixing. The temperature rises in about 15 minutes to 40° C. and then falls again rapidly. Chlorine is led in for a further 15–30 minutes. Excess chlorine and the hydrochloric acid formed are driven off with air and then the chlorosulphonic acid formed during the reaction is first decomposed in the cold with sufficient water so that an approximately 98% sulphuric acid results. It is then heated to 90° C. and adjusted at this temperature to 94% $H_2SO_4$, stirred cold and filtered off. The filter cake is then washed first with 90% acid and finally with water until the reaction is neutral, and dried.

Practically pure 1,4-dichloro-5-nitro-anthraquinone is obtained in very good yield.

Example 28

28.8 g. of a technically produced mixture of 1,5 and 1,8-nitro-chloro-anthraquinone are stirred in 270 g. of 2½% oleum at 25° C., and treated with chlorine, with addition of 0.2 g. of iodine, until a chlorine content of 21.7–22.6% is reached. The reaction material is turned out onto ice water, the precipitate is filtered off with suction, washed neutral and dried.

Yield: 31.9 g.=99% of the theoretical. Melting point: 235–248° C.

Example 29

50 g. of 1-nitro-anthraquinone of melting point 225–228° C. (melting point pure=231–232° C.) are dissolved in 600 ml. of chlorosulphonic acid with addition of 1.5 g. of iodine at room temperature and treated with chlorine. The temperature rises rapidly to about 30° C., remains there for some time, and then falls again. The melting point of a sample first rises, then falls, and shows a distinct rise at the end of the reaction. When a chlorine content of 22% is reached, the material is turned out onto water and worked up in the usual way. 52.2 g.=95% of the theoretical, are obtained of 1,4-dichloro-5-nitro-anthraquinone of melting point 232–247° C. After recrystallisation from nitrobenzene a melting point of 247–256° C. is reached.

If the chlorination is interrupted when an analysed sample shows a chlorine take up of only 1 atom, a mixture is obtained in which, as can be shown chromatographically, besides a little starting material and 1,4-dichloro-5-nitro-anthraquinone, there is predominately present 1-nitro-5-chloro-nitroquinone and 1-nitro-8-anthraquinone.

Example 30

30 g. of 1-nitro-anthraquinone are dissolved in 315 ml. of sulfuric acid monohydrate and 40 ml. of 20% oleum and, after addition of 0.7 gram of iodine, chlorinated in the usual way until 2 atoms of chlorine are taken up. After driving off the hydrochloric acid formed, the acid content is slowly reduced to 40–90° C. with 50% $H_2SO_4$ to 93% acid. Coarse crystalline 1,4-dichloro-5-nitro-anthraquinone is obtained in good quality.

Example 31

50 parts of 1,4-di-phthalimido-anthraquinone are dissolved in 550 parts of 3.5% oleum and mixed with one part of powdered iodine. Starting at 30° C. a strong current of chlorine is conducted into this solution with vigorous stirring. The temperature rises of itself to 50–55° C. within 20 minutes, is maintained at this temperature for a short time and then begins to fall slowly. As soon as this is the case, the chlorination is interrupted, the reaction material is diluted with water to 90% acid and hydrolysed for 30 minutes at 100–110° C. At this temperature it is then slowly diluted with water to 60% acid and stirred cold. Apart from phthalic acid, 1,4-diamino-5,8-dichloro-anthraquinone separates as a sulphate in almost colourless needles which are filtered off with suction, washed and hydrolysed with water. After boiling with dilute ammonia, 27.5 parts=89% of the theoretical are obtained of 1,4-diamino-5,8-dichloro-anthraquinone. Chlorine content: 23.7% (theoretical: 23.1% for diamino-dichloro-anthraquinone). The compound is a violet-blue powder which dissolves in concentrated $H_2SO_4$ with a pale yellow colour, in boron acetic anhydride with a violet colour, and in pyridine with a clear reddish blue colour. The compound contains as single impurity some 1,4-diamino-2,5,8-trichloro-anthraquinone.

By benzoylation, 1,4-dibenzoylamino-5,8-dichloro-anthraquinone is obtained therefrom crystallised in coarse red prisms of melting point 278–280° C. By hydrolysis pure 1,4-diamino-5,8-dichloro-anthraquinone is obtained from it of melting point 280–283° C.

Example 32

80 parts of 1,4-di-phthalimido-anthraquinone are dissolved in 1500 parts of 3.5% oleum, mixed with 1.5 parts of iodine and chlorinated at 30–35° C. until a hydrolysed sample shows chromatographically only traces of 1,4-diamino-5,8-dichloro-anthraquinone. This is the case after about 5–6 hours. The acid concentration is then adjusted as described in Example 1, followed by hydrolysis and separation of the amine as sulphate. After working up in a manner analogous to that described in Example 31, there is obtained: 41.8 parts=76% of the theoretical of 1,4 - diamino - 2,5,8-trichloro-anthraquinone. Chlorine content: 31.5% (theoretical: 31.15% for trichloro-diamino-anthraquinone). This amine contains as impurities a little 1,4-diamino-5,8-dichloro-anthraquinone and traces of a tetrachloro derivative. By benzoylation there is obtained therefrom pure 1,4-dibenzoyl-amino-2,5,8-trichloro-anthraquinone in long yellow needles of melting point 299–300° C. The trichloro-diamino-anthraquinone is similar in its solution colours to 1,4-diamino-5,8-dichloro-anthraquinone.

Example 33

20 parts of 1-phthalimido-anthraquinone are dissolved in 400 parts of 3% oleum, mixed with 0.5 parts of iodine and chlorinated at 30–40° C. until a hydrolysed sample shows chromatographically only a little residual 1-amino-5,8-dichloro-anthraquinone. This is the case after 5–6 hours. The reaction mixture is then pasted up, washed, boiled with $NH_3$ and dried. 25.6 parts are obtained with a chlorine content of 27.8%. After hydrolysis with 90% sulphuric acid, 16.8 parts remain of crude 4,5,8-trichloro-amino-anthraquinone=88% of the theoretical. Chlorine content: 33.2% (theoretical: 32.6% for amino-trichloro-anthraquinone). It can be readily purified by way of the benzoylamino compound (melting point 285–287° C.).

Example 34

(a) 10 parts of 1,4-disulphimido-anthraquinone [production according to 34(b)] are dissoved in 160 parts of sulphuric acid monohydrate, the solution is mixed with 35 parts of 20% oleum and 0.5 part of finely powdered iodine. With vigorous stirring, chlorine is now conducted in. The temperature rises in ten minutes from 30–40° C. and stays at this temperature for a short time. As soon as it begins to fall, the reaction is interrupted and the product worked up as follows: it is diluted with water to 90% acid and the sulphimido groups are hydrolysed at 110–120° C. It is further diluted at 90° C. with water to 60% acid and stirred cold. The sulphate which separates in colourless rods is filtered off with suction, decomposed with water, washed neutral and dried. 7.1 parts=84% of the theoretical are obtained of 1,4-diamino-5,8-dichloro-anthraquinone, which is slightly impure by virtue of some 2,5,8-trichloro-1,4-diamino-anthraquinone. Chlorine content: 24.4%. The compound can be obtained pure by conversion into the benzoylamino derivative follower by hydrolysis, and then melts at 280° C. This product proved to be identical with a preparation which was obtained from 5,8-dichloro-anthraquinone-1-oxamic acid by mononitration in the 4-position, hydrolysis and reduction.

(b) The production of the 1,4-disulphimido-anthraquinone is carried out according to the process of Example 1 of the German patent specification No. 268,592 in the following way:

A solution of 5 parts of 1,4-diamino-anthraquinone is heated in 100 parts of fuming sulphuric acid which contains 45% of $SO_3$, to 50–60° C. until a sample dissolves completely in ammonia. The melt is cooled and diluted by dropwise addition of water to about 80% sulphuric acid. 1,4-disulphimido-anthraquinone thereby separates as red crystals. The compound is filtered off and washed with water.

Example 35

20 parts of 1,4-diamino-anthraquinone are dissolved in 140 parts of 65% oleum with ice-cooling. This solution is heated slowly to 55–60° C. and held at this temperature until a sample is completely soluble in dilute ammonia. With cooling, 300 parts of sulphuric acid (66° Bé.) are slowly added, the mixture is treated with 1 gram of iodine and chlorine is led in with vigorous mixing starting at 20° C. The temperature rises in about 30 minutes to 40° C. As soon as it begins to fall, the reaction is interrupted and the reaction material is worked up in a manner analogous to that in Example 34(a).

21.2 parts of 1,4 - diamino - 5,8 - dichloro-anthraquinone=83% of the theoretical are obtained.

Example 36

(a) 10 parts of 1,4-disulphimido-2,3-dichloro-anthraquinone [for production see 36(c)] are dissolved in 180 parts of 5% oleum, mixed with 0.5 part of iodine and strongly chlorinated starting at 30° C. The temperature rises rapidly above 40° C. and begins to fall again already after about ten minutes. When it has fallen by about 2° C. the chlorination is interrupted, the reaction material is turned out onto water, washed neutral and dried. Yield: 11.1 parts=95% of the theoretical. Chlorine content: 28.1%.

(b) 11 parts of this violet-red tetrachloro-disulphimido-anthraquinone are hydrolysed with about 150 parts of sulphuric acid monohydrate at 130–135° C., to give a tetrachloro-diamino-anthraquinone whose solution is put into a large amount of water. The violet-blue precipitate is filtered off with suction, washed, boiled with dilute ammonia and dried. 8.1 parts=97% of the theoretical are obtained. Chlorine content: 37.8%. This product melts after recrystallisation from dimethyl formamide at 355° C. and proved to be identical with a preparation which could be obtained by introducing two chlorine atoms into 1,4-diamino-5,8-dichloro-anthraquinone by means of sulphuryl chloride. Therefore, 1,4 - diamino-2,3,5,8-tetrachloro-anthraquinone is present. This compound dissolves in boron acetic anhydride in the hot, with a greenish blue colour. In high boiling organic solvents it dissolves with a colour similar to that of 1,4-diamino-5,8-dichloro-anthraquinone, and the solution colour in concentrated sulphuric acid is reddish yellow.

(c) The 1,4 - disulphimido-2,3-dichloro-anthraquinone is obtained according to the process of Example 3 of the German patent specification No. 268,592 in the following way:

20 parts of 1,4-diamino-2,3-dichloro-anthraquinone are dissolved in 400 parts of 45% fuming sulphuric acid and heated for an hour at 80° C. It is then cooled to 20° C. It is then cooled to 20° C. and sufficient water is added so that approximately 62% sulphuric acid is obtained. 1,4 - disulphimido-2,3-dichloro-anthraquinone thus separates as red crystals which are filtered off and washed with water.

We claim:

1. The process for producing substituted 5,8-dichloro-anthraquinones which comprises treating, in a medium selected from the group consisting of 95–100% sulfuric acid, oleum and chlorosulfonic acid, a compound of the formula:

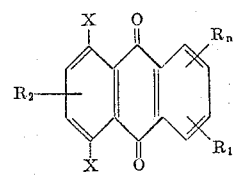

wherein R is selected from the group consisting of nitro, amino, alkylamino and dialkylamino wherein each alkyl group contains up to 4 carbon atoms, acylamino, diacylamino, piperidino, morpholino, phthalimido and sulfimido; $n$ is 1 or 2, $R_1$ is selected from the group consisting of hydrogen, chlorine, bromine, the sulfonic acid group, the carboxylic acid group and alkyl of up to 4 carbon atoms; $R_2$ is selected from the group consisting of hydrogen, chlorine, bromine and alkyl of up to 4 carbon atoms; and X is selected from the group consisting of hydrogen and chlorine, at least one X being hydrogen, with chlorine at a temperature between 10 and 80° C. and recovering the resulting substituted 5,8-dichloro-anthraquinone.

2. The process of claim 1 wherein the treatment with chlorine is carried out in the presence of a halogenation catalyst.

3. The process of claim 1 wherein 1-amino-anthraquinone is chlorinated to obtain 1-amino-5,8-dichloro-anthraquinone.

4. The process of claim 1 wherein 1,4-diphthalimido-anthraquinone is chlorinated and subsequently hydrolyzed to obtain 1,4-diamino-5,8-dichloro-anthraquinone.

5. The process of claim 1 wherein 1,4 - disulfimido-anthraquinone is chlorinated and subsequently hydrolyzed to obtain 1,4-diamino-5,8-dichloro-anthraquinone.

References Cited by the Examiner

UNITED STATES PATENTS

| | | | |
|---|---|---|---|
| 1,837,837 | 12/1931 | Rintelman | 260—3 |
| 2,486,210 | 10/1949 | Scalera et al. | 260—381 |
| 2,862,930 | 2/1958 | Caliezi et al. | 260—351 |
| 2,990,413 | 6/1961 | Gehrke | 260—380 |
| 3,147,284 | 9/1964 | Rhyner | 260—380 X |
| 3,164,615 | 1/1965 | Buecheler | 260—380 X |

OTHER REFERENCES

Wagner et al.: Synthetic Organic Chemistry, New York, John Wiley and Sons, Inc., 1953, p. 679.

Richter: Textbook of Organic Chemistry, New York, John Wiley and Sons, Inc. (1938 edition) (p. 205).

LORRAINE A. WEINBERGER, *Primary Examiner.*

DANIEL D. HORWITZ, *Examiner.*

H. C. WEGNER, *Assistant Examiner.*